United States Patent
Suzuki et al.

(10) Patent No.: US 7,457,916 B2
(45) Date of Patent: Nov. 25, 2008

(54) STORAGE SYSTEM, MANAGEMENT SERVER, AND METHOD OF MANAGING APPLICATION THEREOF

(75) Inventors: Katsuyoshi Suzuki, Odawara (JP);
Toshimitsu Kamano, Odawara (JP);
Kenji Muraoka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/492,340

(22) Filed: Jul. 24, 2006

(65) Prior Publication Data
US 2007/0011579 A1    Jan. 11, 2007

Related U.S. Application Data

(63) Continuation of application No. 10/444,650, filed on May 22, 2003, now abandoned.

(30) Foreign Application Priority Data

May 24, 2002    (JP)    ............... 2002-150145

(51) Int. Cl.
*G06F 12/02*    (2006.01)
(52) U.S. Cl. ............... 711/114; 711/111; 711/112; 711/113; 714/6; 714/7; 714/8; 714/47; 714/48; 714/57; 709/203
(58) Field of Classification Search .......... 711/111–113
See application file for complete search history.

(56) References Cited

U.S. PATENT DOCUMENTS

| | | | |
|---|---|---|---|
| 6,209,059 B1 * | 3/2001 | Ofer et al. ............... 711/114 |
| 6,529,995 B1 * | 3/2003 | Shepherd ............... 711/114 |
| 6,928,589 B1 * | 8/2005 | Pomaranski et al. ........... 714/47 |
| 2002/0066050 A1 * | 5/2002 | Lerman et al. ............... 714/6 |
| 2003/0023933 A1 * | 1/2003 | Duncan ............... 714/807 |
| 2003/0061331 A1 * | 3/2003 | Nakamura et al. ........... 709/223 |
| 2003/0115604 A1 * | 6/2003 | Yamamura et al. ............ 725/55 |
| 2004/0078461 A1 * | 4/2004 | Bendich et al. ............. 709/224 |

FOREIGN PATENT DOCUMENTS

| | | |
|---|---|---|
| JP | 2001-337790 A | 12/2001 |
| JP | 2002-063063 A | 2/2002 |

OTHER PUBLICATIONS

Japan Patent Office (JPO) office action for JPO patent application JP2002-150145 (Apr. 1, 2008).

* cited by examiner

*Primary Examiner*—Pierre-Michel Bataille
*Assistant Examiner*—Hetul Patel
(74) *Attorney, Agent, or Firm*—Townsend and Townsend and Crew LLP (57) ABSTRACT

In a storage system having a plurality of disk array devices connected through a network to a host for running an application, and a management server for monitoring the disk array devices, the disk array device includes a physical disk error detecting unit for detecting an error in a physical disk. Meanwhile, the management server stores a corresponding relationship among the application, a logical volume used by the application, and the physical disk corresponding to the logical volume. Moreover, the management server includes an application detecting unit for detecting the application using the logical volume corresponding to the physical disk with the error according to the corresponding relationship when the physical disk error detecting unit of the disk array device detects the error in the physical disk.

18 Claims, 5 Drawing Sheets

| LU | HDD | APPLICATION |
|---|---|---|
| LU0 | HDD-A | AP-A |
| | HDD-B | AP-B |
| | HDD-C | AP-C |
| | HDD-D | |
| LU1 | HDD-B | AP-D |
| | HDD-C | AP-E |
| | HDD-D | |
| | HDD-E | |

STORAGE SYSTEM, MANAGEMENT SERVER, AND METHOD OF MANAGING APPLICATION THEREOF

CROSS-REFERENCE TO RELATED APPLICATIONS

The present application claims priority upon Japanese Patent Application No. 2002-150145 filed on May 24, 2002, which is herein incorporated by reference.

BACKGROUND OF THE INVENTION

1. Field of the Invention

The present invention relates to a storage system, a management server, and a method of managing an application thereof.

2. Description of the Related Art

A host uses a plurality of disk array devices as external storage devices upon operation of an application. A disk array device includes a plurality of disks. To be more precise, the host is connected to the disk array devices through a storage area network (SAN), whereby data are distributed to a logical volume (LU) composed of the plurality of disks to be stored.

As a technology for enhancing fault tolerance of such a disk array device, for example, Japanese Patent Application Laid-open Publication No. 2000-305720 discloses a technology for predicting a failure of a disk. Meanwhile, according to Japanese Patent Application Laid-open Publication No. 2001-167035, a client on a network is monitored by using a WWW browser in order to enhance fault tolerance of the disk array device. Moreover, Japanese Patent Application Laid-open Publication No. Hei11-24850 discloses a technology for recovering data contained in a failed drive such that the data belonging to a volume of a highest frequency of failures first, then the recovery is attempted according to the failure frequency Furthermore, Japanese Patent Application Laid-open Publication No. 2000-20245 discloses a technology for automatically configuring a disk drive connected to a controller.

In general, a disk array device utilizes a "Redundant Array of Inexpensive Disks" (RAID) technology to prevent data loss or system down of a host. Parity and error correction data are added to data to be written, and the data are distributed to a plurality of disks for storage. In this way, it is possible to restore correct data using the parity even if one of the disks is out of order.

However, execution of data restoring processing, when a disk is out of order, incurs performance degradation of operation of an application as compared to a normal condition. Moreover, if a spare disk exists when the drive is blocked, the blocked disk will be restored by using the spare disk. Execution of such restoring processing also incurs performance degradation of an application as compared to a normal condition.

Nevertheless, such restoring processing has been executed without notifying a user. Accordingly, the user would not recognize that the cause of the performance degradation of the application is due to the data restoring processing and has occasionally sought other causes.

In addition, when the drive is blocked, a system administrator receiving such warning has had difficulty predicting influence to the performance degradation of the application.

SUMMARY OF THE INVENTION

In a storage system having a plurality of disk array devices connected to a host, which runs an application, through a network, and a management server for monitoring each drive installed in the disk array devices, the disk array device includes a physical disk error detecting unit for detecting an error in a physical disk. The management server stores a corresponding relationship among the application, a logical volume used by the application, and the physical disk corresponding to the logical volume. The management server includes an application detecting unit for detecting the application using the logical volume corresponding to the physical disk with the error according to the corresponding relationship when the physical disk error detecting unit of the disk array device detects the error in the physical disk.

Note that the management server may be disposed inside the disk array device. Moreover, it is also possible to provide a configuration where a management server unit having functions of the management server is incorporated into the disk array device. In other words, the term "management server" also includes the concept of the "management server unit".

The present invention can suppress performance degradation of an application.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

A management server may include application notifying unit that notifies a user terminal of information concerning the application detected by the application detecting unit.

The corresponding relationship stored by the management server contains settings on priority of execution of a job of an application. The management server may include application processing capability allocating unit for allocating a processing capability of the application according to the priority of execution of the job of the application which uses the physical disk with the error when the physical disk error detecting unit of the disk array device detects the error in the physical disk.

The management server may give higher priority to execution of the job of the application using the physical disk with the error when the physical disk error detecting unit of the disk array device detects the error in the physical disk.

The application processing capability allocating unit of the management server may allocate the processing capability of the application according to operation input of a user.

The management server may include at least the application detected by the application detecting unit, the disk array device used by the application, and application information displaying unit for displaying application information concerning the processing capability allocated to the application on a screen of a display unit.

The disk array device may be capable of executing mirroring, and the management server may include mirror disk switching unit for setting a mirror disk for the application to use, when the physical disk error detecting unit of the disk array device detects an error in the physical disk.

Herein, the expression "capable of executing mirroring" refers to a state where the disk array device supports "RAID-1" ("mirror" or "mirroring") as a RAID level.

The disk array device may include the physical disk error detecting unit for detecting an error in the physical disk, and the management server may include internal copy switching unit for executing internal copy processing by allocating a new logical volume to an unused disk area (an empty disk) in the disk array device, when the physical disk error detecting unit of the disk array device detects an error in the physical disk, and thereby setting the new logical volume for the application to use.

Figure 1:
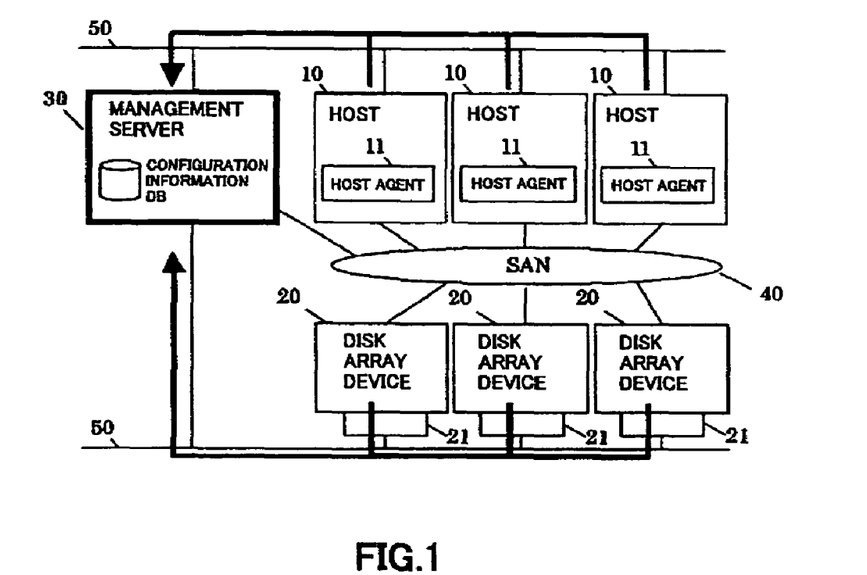
FIG. 1 is a block diagram showing an entire configuration of a storage system, which is one of the embodiments of the present invention.

FIG. 1 shows an entire configuration of a storage system according to the present embodiment. A plurality of hosts 10 are connected to a plurality of disk array devices (also referred to as "disk subsystems") 20 through a storage area network (SAN) 40. An application is installed in each of the hosts (computers) 10 by a user, and the hosts 10 share the plurality of disk array devices 20 as external storage devices of data required for running this application. Alternatively, there is also a case where the application itself is installed in the disk array devices 20. That means the scope of the present invention shall not be limited by which directory the application installed in. A management server 30 can be connected to the plurality of hosts 10 and to the plurality of disk array devices 20 through a different local area network (LAN) 50 of SAN 40. Alternatively, the management server 30 may be directly connected to the SAN 40.

A host agent 11 is installed in each host 10. The host agent 11 is activated when a request for acquiring system configuration information to the respective disk array devices 20 is made due to operation input to the management server 30 by a system administrator or due to an event such as a failure of the disk array device 20. In order to acquire "host logical configuration information" on an operation system (OS) of the host 10 dominating the host agent 11, the host agent 11 issues a command to a logical volume of the disk array device 20, which is accessible by the host 10 of its own, to receive an access path.

The host agent 11 utilizes the OS, a database, and an application interface of upper middleware. Thereby acquires a name of a file stored in the logical volume, a capacity of the file, and the location in a file system which the file belongs to.

Each of the disk array devices 20 includes an external connection interface 21. Each of the disk array devices 20 notifies the management server 30 of the configuration information, the performance and the containing data of its own through the external connection interface 21. Moreover, the disk array device 20 detects an error such as a failure of a physical disk of its own and notifies the management server 30. Alternatively, the management server 30 may gain access to the disk array device 20 and collect the configuration information, the performance, the data, and information concerning the failure thereof. In another embodiment where the management server 30 is connected only to the SAN 40, similar information as described above is sent or collected directly to the management server 30 by using a SAN interface for the management server 30, instead of using the external connection interface 21.

The disk array device 20 incorporates a control board (a controller) therein. The disk array device 20 is controlled by a microprogram (physical disk error detecting unit) which runs on a processor (CPU, physical disk error detecting unit) implemented in this controller.

By this microprogram in operation, it is possible to detect errors including failures of the physical disk of the disk array device 20, such as an I/O error. In other words, it is possible to predict performance degradation of the application by detecting failures and errors in the physical disk. The method of detecting such errors will be described specifically as follows. For example, data control of the disk array device 20 is performed by the control board (controller) of the disk array device. The microprogram runs on the CPU implemented on this controller and controls the device. When there is a request from an upper layer (such as a host) for reading the data, the microprogram performs the control so as to read the data. Normally, data reading is performed via a cache, and in the case where the data do not exist in the cache, the data are read from the drive and stored in the cache or directly sent to the upper layer. In the RAID, the data to be read are normally stored in the drives in a distributed manner. Moreover, the RAID adopts the mode of regenerating data from parity even if part of the data cannot be read. In the event of reading the data, the control of reading the distributed data is performed by the microprogram. If a part of the data cannot be read, the control of reading the parity for restoring the data is performed by the microprogram. Therefore, the processing for performing data restoration from the parity is executed by the microprogram. Accordingly, the frequency the restoration can be perceived by the microprogram. For example, the microprogram can also perceive the frequency of failures of when accessing each drive. Thus, it is possible to predict an occurrence of an error such as a failure in a certain drive if the failures of when accessing exceed a given threshold (such as a number of simple cumulative failures or a number of cumulative failures) Such processing is adopted not only for reading processing, but also for writing processing similarly.

Figure 2:
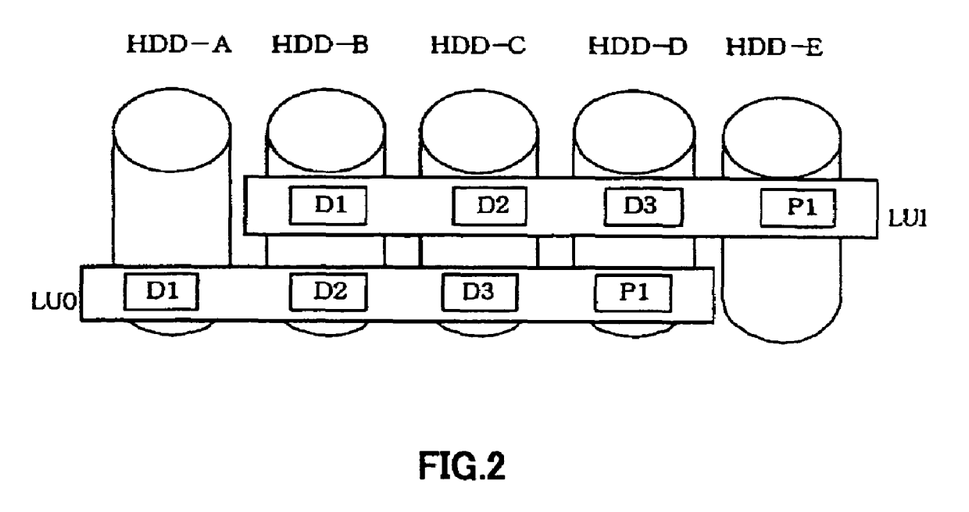
FIG. 2 is a conceptual diagram showing an aspect of distributed data storage according to one of the embodiments of the present invention.

FIG. 2 is a conceptual diagram showing an aspect of distributed data storage. As shown in FIG. 2, the disk array device 20 includes a plurality of drives. In the example shown in FIG. 2, five disks marked by A to E. are installed. Moreover, a logical unit (LU) is defined in these five disk drives. This logical unit is regarded as one logical volume from the outside. For example, a logical volume (LU0) includes four drives marked by A, B, C and D. In the disk array device 20, at a RAID level referred to as "RAID-5", the data are distributed and written across the drives (physical disks) HDD-A to HDD-E as in D1, D2 and D3. Further, parity P1 is also written. In this way, the drives HDD-A to HDD-E, which store the distributed data D1, D2 and D3 and the parity P1, collectively construct the logical volume (logical unit) LU0 or a logical volume LU1.

Figure 3:
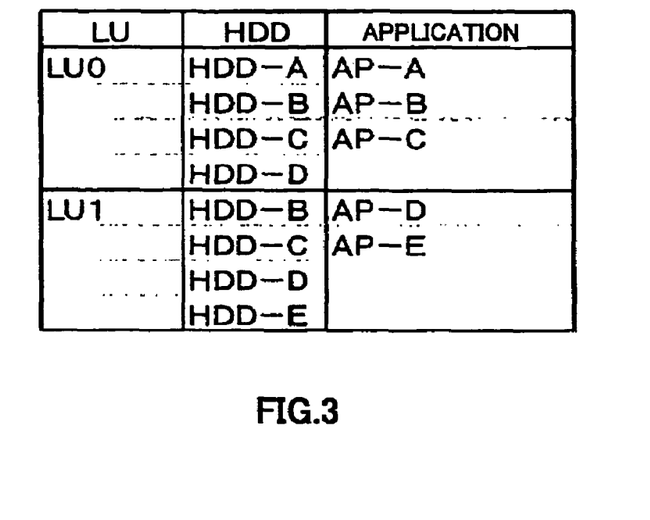
FIG. 3 is a schematic diagram showing a screen for monitoring performance of a disk array device according to one of the embodiments of the present invention.

Meanwhile, as shown in the corresponding table in FIG. 3, regarding the disk array device 20, the management server 30 stores corresponding relationships among applications AP-A to AP-E run on the host 10, the logical volumes LU0 and LU1 used by the applications, and the physical disks HDD-A to HDD-E corresponding to the logical volumes LU0 and LU1.

The corresponding relationships as shown in FIG. 3 may be referenced not only by the system administrator who uses the management server 30, but also by a user who uses the applications through the hosts, with a web screen or the like.

Figure 4:
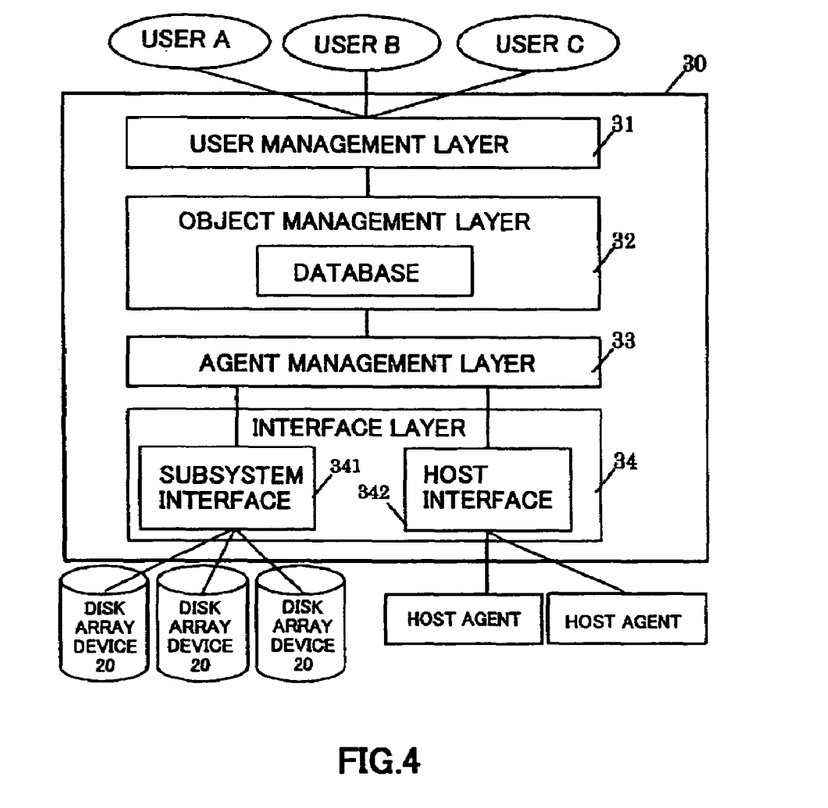
FIG. 4 is a block diagram showing functions of a management server according to the embodiments of the present invention.

The management server 30 has a computer system (application detecting unit, mirror disk switching unit, internal copy switching unit, application notifying unit, application processing capability allocating unit, and application information displaying unit). FIG. 4 is a block diagram showing the functions of this management server 30. The management server 30 includes a user management layer 31, an object management layer 32, an agent management layer 33, and an interface layer 34. The object management layer 32 includes a database for accumulating configuration information concerning the respective disk array devices 20. As described above, the corresponding relationships among the applications, the logical volumes and the physical disks are stored in this database. The interface layer 34 includes a subsystem interface 341 and a host interface 342.

A plurality of user terminals A to C are connected to the management server 30 through the user management layer 31. Moreover, the plurality of disk array devices 20 are connected to the management server 30 through the subsystem interface 341. Furthermore, the hosts 10 are connected to the management server 30 through the host interface 342.

The user management layer 31 manages the user terminals A to C. Herein, the system administrator is also included as one of the users. The object management layer 32 acquires information concerning the configurations, performances and errors such as failures of the respective disk array devices 20 as well as information concerning other events, and stores the information in the database. To be more precise, the information to be stored in this database includes: settings concerning internal access paths and the logical volumes of the respective disk array devices 20, capacities, access authorization, and data transfer of the respective logical volumes; settings concerning data copy among the respective disk array devices 20; settings concerning the performances and control of the respective disk array devices 20; and settings of methods of acquiring and maintaining the performance data, abnormality such as failures, and the configuration information of events in the respective disc devices 20 by user operations of the respective disk array devices.

Although only one management server 30 is shown in FIG. 1, it is possible to use a plurality of management servers 30. Moreover, the management server 30 may be installed inside the disk array device 20. Furthermore, it is also possible to adopt a configuration where a management server unit having the functions of the management server 30 is incorporated into the disk array device 20. In other words, the term "management server" also may be interpreted as the "management server unit". Meanwhile, the management server unit maybe located in a position physically distant from the disk array device 20.

The management server 30 makes periodic inquiries to the respective disk array devices 20 and acquires the information concerning the events of abnormality such as failures. Alternatively, the information concerning the events such as failures or maintenance detected by the respective disk array devices 20 is notified to the agent management layer 33 of the management server 30 through the subsystem interface 341.

Upon notification of the events such as failures, the agent management layer 33 notifies the object management layer 32 by using an interrupt function. The management server 30 recognizes a status change of the disk array device 20 by the object management layer 32 that has received such notification. After recognizing this event, the management server 30 acquires the configuration information of the disk array device 20 and updates the information in the database.

Figure 5:
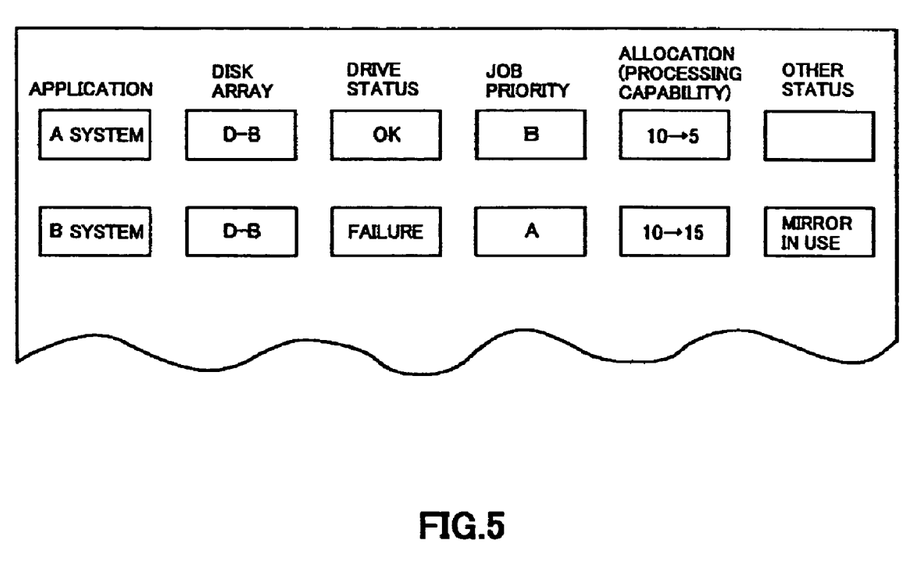
FIG. 5 is a schematic diagram showing a screen for monitoring performances of the disk array device according to the embodiments of the present invention.

As shown in a schematic diagram in FIG. 5, a screen for monitoring the performances of the disk array devices is displayed on a display unit of the management server 30 by a graphical user interface (GUI). The information displayed on this screen is based on the corresponding relationships in FIG. 3 as previously described. As shown in FIG. 5, description will be firstly given regarding an A system as the "application". The A system uses a disk array device "D-B". A "drive status" of this disk array device D-B is indicated as "OK", in other words, there are no abnormality such as a breakdown or a failure therein. Priority of execution of a job ("job priority") of this A system is set to "B" which is lower than "A", and allocation of a processing capability is set to a level "10". A field for "other status" is blank since the "drive status" is "OK" and indicates that no special measures are taken.

Next, description will be given regarding a B system as the "application". The B system uses a disk array device "D-B". The "drive status" of the disk array device D-B is indicated as "failure". Priority of execution of a job ("job priority") of this B system is set to "A" which is higher than "B", thus the priority is set higher than the above-described A system. Moreover, allocation of a processing capability regarding this B system is set to a level "10". A field for "other status" is indicated as "mirror in use" since "drive status" is "failure", and shows that data on a mirror disk are used as a primary (main) I/O.

Figure 6:
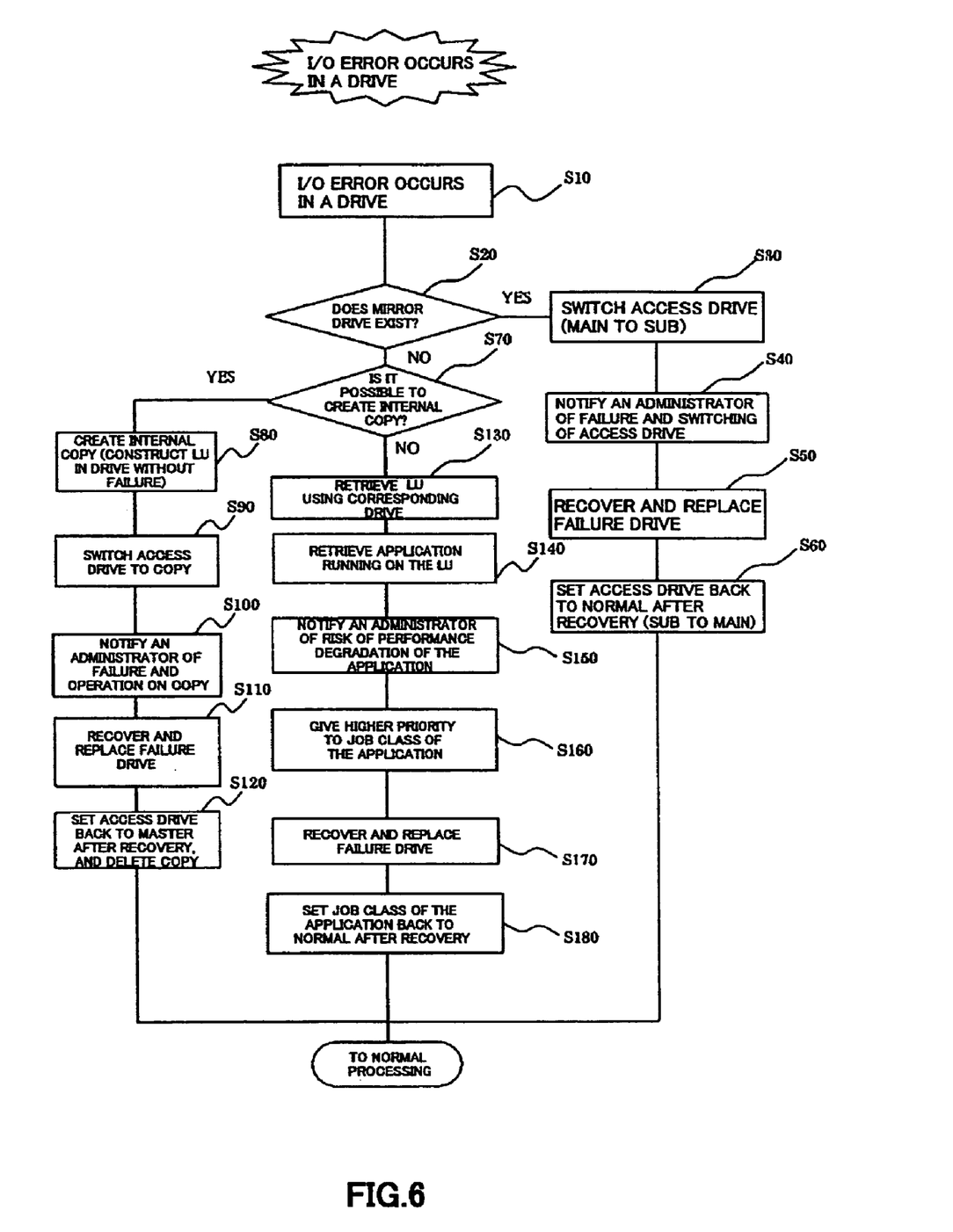
FIG. 6 is a flowchart showing processing upon occurrence of a disk failure according to the embodiments of the present invention.
Figure 7:
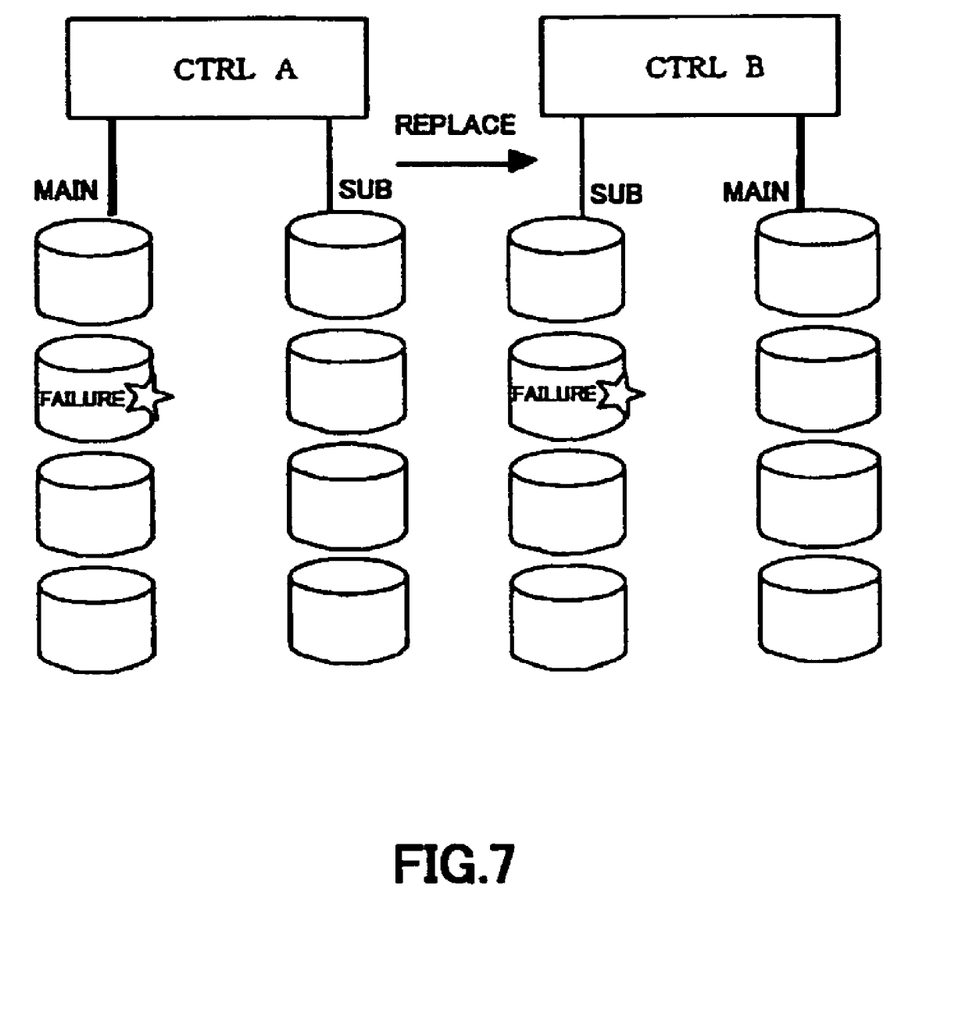
FIG. 7 is a schematic diagram showing an aspect of switching a drive to which an application gains access, from a main drive to a sub drive.

Next, description will be given with reference to a flowchart in FIG. 6, regarding countermeasure processing by the management server in the case where a failure occurs in the disk (a drive or a physical disk). Firstly, when an error in the physical disk such as an I/O error in the drive is detected (S10), judgment is made on whether a mirror drive exists (S20). If the mirror drive exists (S20: YES), the access drive which application uses is switched from the main drive to a sub drive as shown in FIG. 7 (S30). In this way, with respect to the failure of disk, it is possible to eliminate influence to the operation of the application, attributable to an increase in load of processing due to data restoration from the parity. Subsequently, the occurrence of the failure and the state of switching the access drive are notified to the system administrator (S40). For such notification, as shown in FIG. 5, an appropriate method such as displaying on the displaying unit of the management server is used. In addition, it is also possible to notify the information shown in FIG. 5 to the user who uses the application through the host, with a Web screen or the like. Thereafter, if the failed drive is recovered or restored by a replacement, then the access drive is set back to the original drive, which is the normal drive (S50 to S60).

On the contrary, if the mirror drive does not exist (S20: NO), as a temporary processing, judgment is made on whether it is possible to create a mirror (an internal copy or a synchronous copy area) internally (S70). If it is possible to create the internal copy (S70: YES), a new logical volume is created in another drive without failure (S80). The new logical volume, which is internally copied, is set to the access drive which the application uses (S90). Subsequently, the occurrence of the failure and the state of switching the access drive are notified to the system administrator (S100). For such notification, as shown in FIG. 5, an appropriate method such as displaying on the displaying unit of the management server is used. In addition, it is also possible to notify the information shown in FIG. 5 to the user who uses the application through the host, with a Web screen or the like. Thereafter, when the failed drive is recovered or restored by a replacement, the access drive is set back to the original drive, which is the normal drive, and the internal copy is deleted (S110 to S120).

Meanwhile, if it is impossible to create the internal copy (S70: NO), it is possible to use another disk array device. Based on the above-described corresponding table in FIG. 3, the logical volume corresponding to the failed drive is retrieved (S130). Thereafter, as a result of the retrieval, the application using the acquired logical volume is detected (S140). Subsequently, the risk of performance degradation of the detected application is notified to the system administrator (S150). For such notification, as shown in FIG. 5, an appropriate method such as displaying on the displaying unit of the management server is used. In addition, it is also possible to notify the information shown in FIG. 5 to the user who uses the application through the host, with a Web screen or the like.

Next, as shown in the above-described information displayed on the screen in FIG. 5, countermeasure processing for load distribution of the application having the risk of the performance degradation is executed according to the job priority. For example, as shown in FIG. 5, if there is a risk of performance degradation of the B system as the application having the higher priority "A" and the mirror drive is not used under that status, the allocation of the processing capability is increased from "10" to "15", so that the performance of the application can be maintained without being influenced by the drive failure. Herein, an increase in the allocation of the processing capability is equivalent to an increase in an allocation rate of the CPU resources.

Moreover, a similar effect can be exerted by raising the job priority of the application (S160). Alternatively, it is also possible to relatively avoid a decrease in the processing capability of the application having the higher priority "A" by reducing the allocation of the processing capability at the A system side as the application having the lower priority "B".

Such allocation of the processing capabilities and settings of the job priority can be performed through the screen displayed on the display unit in FIG. 5 by the GUI. Thereafter, when the failed drive is recovered or restored by a replacement, the allocation of the processing capabilities and the job priority of the applications are set back to the original states (S170 to S180).

As for another embodiment, it is also possible to distribute the load by each logical volume unit, in the state without failures such as errors in a disk (drive). This is performed by monitoring a usage status of the application and an access status regarding the respective logical volumes. In this way, it is possible to prevent an event such as performance degradation of a certain logical volume.

The embodiments of the present invention can exert the following effects:

The management server stores corresponding relationships among the applications, the logical volumes used by the applications, and the physical disks corresponding to the logical volumes. Thus, it is possible to detect the application which may be influenced by the error in the physical disk and to predict the performance degradation thereof. Based on this prediction, it is possible to suppress the performance degradation or an abnormal termination.

The management server notifies the user terminal of information concerning the application which may be influenced by the error in the physical disk. In this way., it is possible to advise the user on the risk of the performance degradation of the application.

The priority of execution of the job of the application is set in the corresponding relationship stored by the management server. The management server allocates the processing capability of the application according to the priority of execution of the job of the application which uses the physical disk with the error. In this way, it is possible to control the load of the application.

The management server gives higher priority to execution of the job of the application which uses the physical disk with the error. In this way, it is possible to suppress the performance degradation of the application.

The management server allocates the processing capability of the application according to operation input of the user. The user can control the load of the application which may be influenced by the error in the physical disk.

The management server displays the information concerning the applications, the disk array devices used by the applications, and the processing capabilities allocated to the applications on the screen of the display unit. In this way, the user can monitor the logical volume and the application which may be influenced by the error in the physical disk, and the processing capability allocated to the application on the display unit.

Upon detection of the error in the physical disk, the management server sets the corresponding mirror disk to which the application uses. In this way, it is possible to prevent the performance degradation of the application beforehand.

Upon detection of the error in the physical disk, the management server allocates a new logical volume to an unused disk area in the disk array device and executes internal copy processing, whereby the management server sets the new logical volume to which the application uses. In this way, it is possible to prevent the performance degradation of the application beforehand.

Although the present invention has been described above based on the embodiments, it is to be noted that the present invention shall not be limited to the embodiments stated herein, and that various modifications can be made without departing from spirit of the invention.

What is claimed is:

1. A storage system comprising;
   a plurality of disk array devices connected through a network to at least one host for running a plurality of applications and each disk array device having a plurality of physical disks a plurality of logical volumes relating to said physical disks, a cache memory temporarily storing data sent from the host to the logical volumes, and a controller to transfer data to the physical disks via the cache memory: and
   a management server configured to monitor said disk array devices, said management server being connected to said host and said disk array devices, and to communicate management information to said host and said disk array devices,
   wherein said disk array devices include a physical disk error detecting unit configured to detect an error in a physical disk of said physical disks:
   wherein said management server stores the management information including a corresponding relationship among identification of each of said applications, identification of at least one logical volumes used by said each application, and identification of at least one of said physical disks corresponding to said at least one logical volume, and
   wherein said management server includes an application detecting unit configured, when said physical disk error detecting unit of said disk array devices identifies an error in said physical disk, to detect said application using said logical volume corresponding to said physical disk, with the error according to said corresponding relationship stored in said management server.

2. A storage system according to claim 1, wherein said management server includes an application notifying unit configured to notify a user terminal of information concerning said application detected by said application detecting unit.

3. A storage system according to claim 1,
wherein said corresponding relationship stored by said management server contains settings on priority of execution of a job of said application, and
wherein said management server includes an application processing capability allocating unit configured to allocate a processing capability of said application according to said priority of execution of the job of said application which uses said physical disk with the error when said physical disk error detecting unit of said disk array device detects the error in said physical disk.

4. A storage system according to claim 3, wherein said management server gives higher priority to execution of said job of said application which uses said physical disk with said error when said physical disk error detecting unit of said disk array device detects said error in said physical disk.

5. A storage system according to claim 3, wherein said application processing capability allocating unit of said management server allocates the processing capability of said application according to operation input of a user.

6. A storage system according to claim 1, wherein said management server at least includes applications detected by said application detecting unit, said disk array device used by said application, and an application information displaying unit configured to display application information concerning a processing capability allocated to said application on a screen of a display unit.

7. A management server for monitoring a plurality of disk array devices connected through a network to at least one host for running a plurality of applications and each disk array device having a plurality of physical disks and a plurality of logical volumes relating to said physical disks and for communicating management information to said host and said disk array devices, said management server being connected to said host and said disk array devices, said management server comprising:
a physical disk error detecting unit configured to detect an error in a physical disk of said physical disks, wherein said management server stores the management information including a corresponding relationship among identification of each of said applications, identification of at least one logical volume used by said each application, and identification of at least one of said physical disks corresponding to said at least one logical volume, and
an application detecting unit configured, when said physical disk error detecting unit of said disk array device identifies an error in said physical disk, to detect said application using a logical volume corresponding to said physical disk with said error according to said corresponding relationship stored in said management server.

8. A management server according to claim 7, further comprising:
an application notifying unit configured to notify a user terminal of information concerning said application detected by said application detecting unit.

9. A management server according to claim 7,
wherein said corresponding relationship contains settings on priority of execution of a job of said application, and
wherein said management server further comprises an application processing capability allocating unit configured to allocate a processing capability of said application according to said priority of execution of said job of said application which uses said physical disk with said error, when said physical disk error detecting unit of said disk array device detects said error in said physical disk.

10. A management server according to claim 9, wherein higher priority is given for execution at said job of said application using said physical disk with said error when said physical disk error detecting unit of said disk array device detects said error in said physical disk.

11. A management server according to claim 9, wherein said application processing capability allocating unit allocates the processing capability of said application according to operation input of a user.

12. A management server according to claim 7 further comprising at least:
applications detected by said application detecting unit, said disk array device used by said application, and an application information displaying unit configured to display application information concerning a processing capability allocated to said application on a screen of a display unit.

13. A method of managing an application by a management server for monitoring a plurality of disk array devices connected through a network to at least one host for running a plurality of applications and each disk array device having a plurality of physical disks and a plurality of logical volumes relating to said physical disks, said management server being connected to said host and said disk array devices, said method comprising:
storing by said management sever management information, including a corresponding relationship among identification of each of said applications, identification of at least one logical volume used by said each application, and identification of at least one of said physical disks corresponding to said at least one logical volume;
communicating by said management server the management information to said host and said disk array devices; and
detecting by said management server said application using said logical volume corresponding to said physical disk with an error according to said corresponding relationship stored by said management server when said disk array device identifies said error in said physical disk.

14. A method of managing an application according to claim 13, wherein information concerning said detected application is notified to a user terminal.

15. A method of managing an application according to claim 14, wherein higher priority is given to execution of said job of said application using said physical disk with said error when said disk army device detects said error in said physical disk.

16. A method of managing an application according to claim 15, wherein the processing capability of said application is allocated according to operation input of a user.

17. A method of managing an application according to claim 13,
wherein said corresponding relationship contains settings on priority of execution of a job of said application, and
wherein a processing capability of said application is allocated according to the priority of execution of said job of said application which uses said physical disk with said error when said disk array device detects said error in said physical disk.

18. A method of managing an application according to claim 13, wherein at least application information concerning said detected application, said disk array device used by said application, and the processing capability allocated to said application are displayed on a screen of a display unit.

* * * * *